Sept. 18, 1951 T. W. CHAREST 2,568,219
SAFETY VALVE
Filed Aug. 8, 1946 2 Sheets-Sheet 1
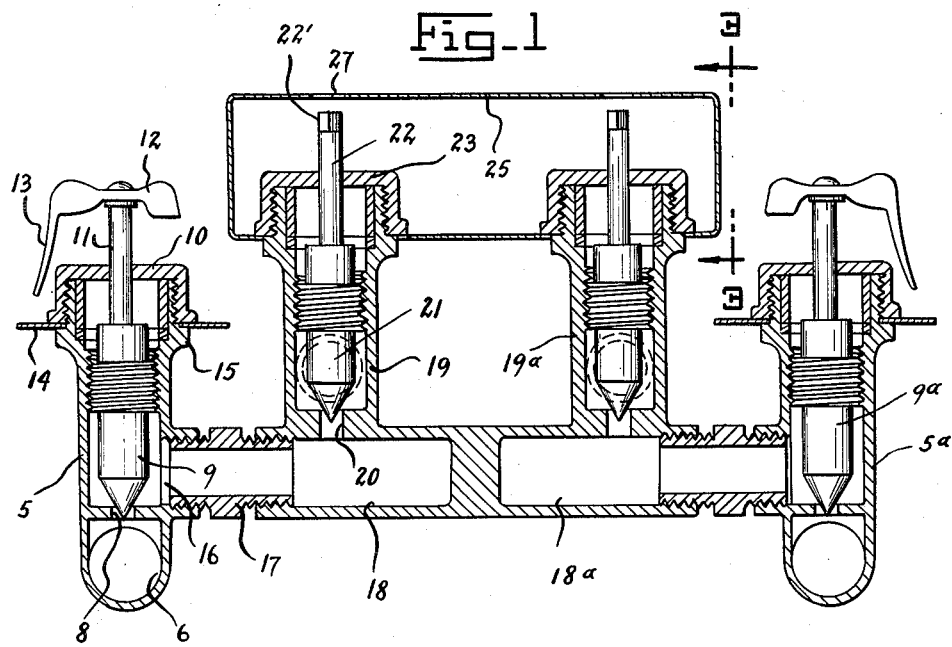
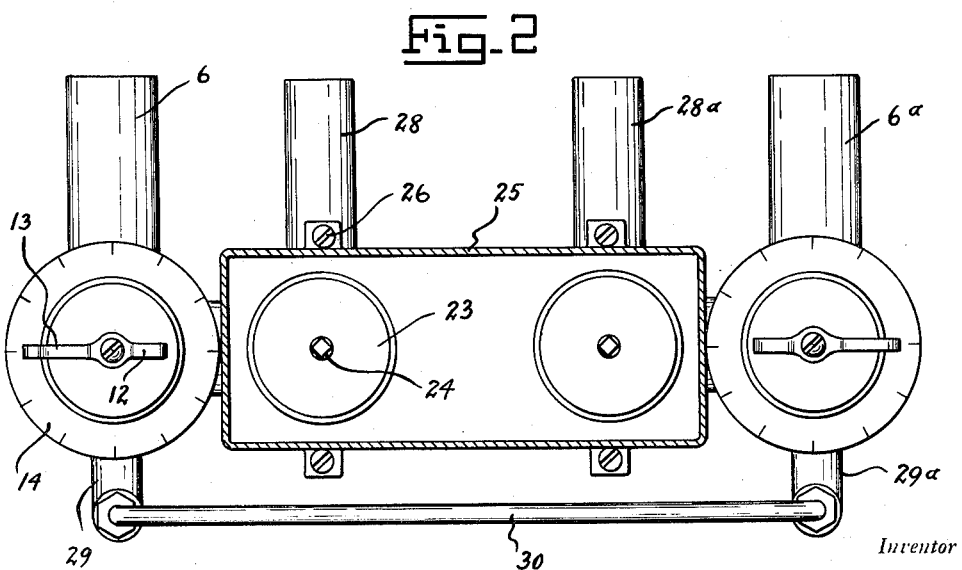
Inventor
THEODORE W. CHAREST
By Clarence A. O'Brien
and Harvey B. Jacobson
Attorneys

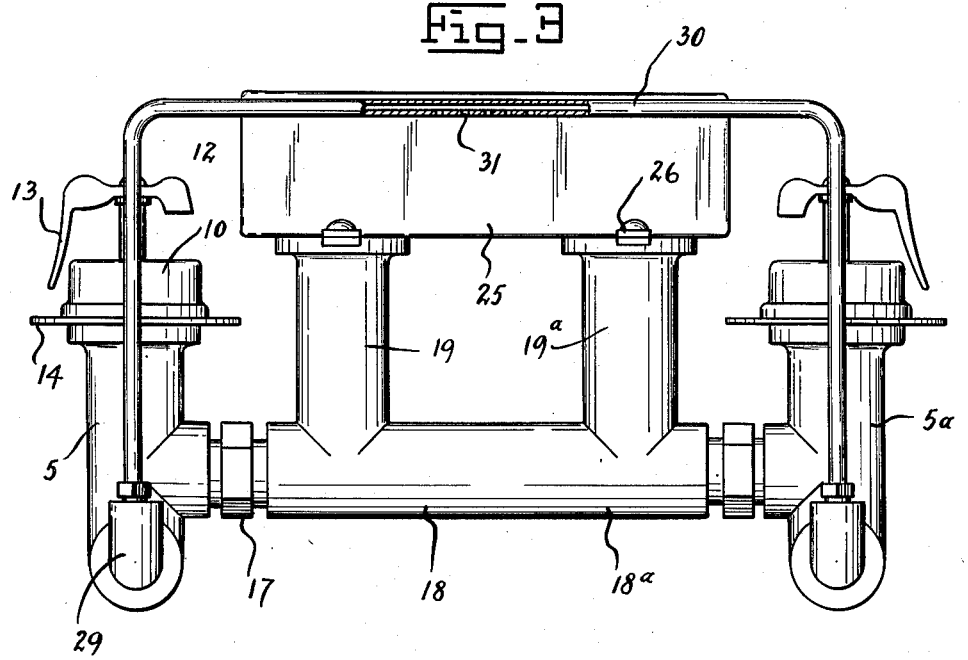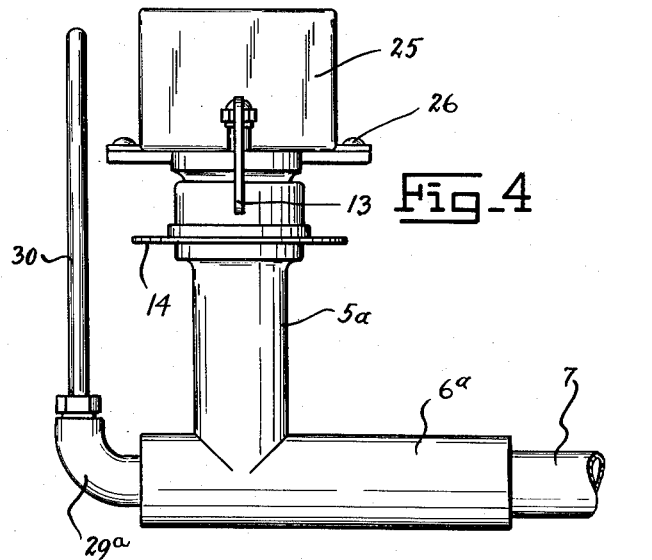

Patented Sept. 18, 1951

2,568,219

UNITED STATES PATENT OFFICE 2,568,219

SAFETY VALVE

Theodore W. Charest, East Hartford, Conn., assignor, by direct and mesne assignments, to The Adjusto Sales Corporation, Hartford, Conn., a corporation of Connecticut Application August 8, 1946, Serial No. 689,297

1 Claim. (Cl. 277—57)

The present invention relates to new and useful improvements in safety valves designed primarily for use in regulating gravity feed range and cabinet oil heaters.

An important object of the invention is to provide a safety valve for use in the indicated manner which will prevent the overflow of oil and thus eliminate the hazard of fires.

A further object of the invention is to provide a safety valve including a service valve and a master valve and in which the master valve is enclosed in a cover to prevent accidental opening thereof or tampering therewith by unauthorized persons after the same has been adjusted in accordance with the requirements.

A still further object is to provide a device of this character of simple and practical construction, which is efficient and reliable in operation relatively inexpensive to manufacture and install in operative position and otherwise well adapted for purposes for which the same is intended.

Other objects and advantages reside in the details of construction and operation as more fully herinafter described and claimed, reference being had to the accompanying drawings forming part hereof, wherein like numerals refer to like parts throughout, and in which:

Figure 1 is a vertical sectional view of a multiple valve assembly;

Figure 2 is a top plan view thereof with parts shown in section;

Figure 3 is a side elevational view with part of the vent tube shown in section;

Figure 4 is an end elevational view, and

Figure 5 is a perspective view of a key provided for adjusting the master valve.

Referring now to the drawings in detail wherein for the purpose of illustration I have disclosed a preferred embodiment of the invention the numeral 5 designates a valve housing having an inlet pipe 6 communicating with its lower end, one end of the inlet pipe being adapted for attaching a supply pipe 7 thereto. The housing 5 above the inlet pipe 6 is provided with a valve seat 8 with which a needle-type valve 9 engages, the valve 9 being threaded in the upper end of the housing 5 for opening and closing movement of the valve on the seat 8 by rotary movement of the valve to vertically adjust the latter.

The top of the valve housing 5 is closed by a cap 10 through which a stem 11 on the upper end of the valve projects.

A handle 12 is secured to the upper end of the stem 11 and on one end of which is formed a pointer 13 arranged in association with a dial plate 14 held in a stationary position on a shoulder 15 on the valve housing by the cap 10.

The valve housing 5 is formed at one side with a discharge port 16 above the valve seat 8 to which one end of a nipple or pipe union 17 is threadily connected, the other end of the nipple 17 communicating with a chamber 18 formed at the lower end of a master valve housing 19.

As indicated in Figure 1 of the drawings the chamber 18 and master valve housing 19 may be of a multiple construction including one or more additional chambers 18a and master valve housings 19a with which a duplicate valve housing 5a is connected and provided with a regulated valve 9a therein as heretofore described, the lower end of the valve housing 5a likewise having an inlet pipe 6a connected thereto.

The regulated valve 9 and 9a are of duplicate construction and the master valve housings 19 and 19a are likewise of duplicate construction and accordingly a detail explanation of one will suffice for both.

A valve seat 20 is positioned between the chamber 18 and valve housing 19 with which a needle-type master valve 21 engages, the master valve being threaded in the housing 19 and is provided with a stem 22 extending upwardly therefrom through a cap 23 threaded on the upper end of the housing 19. The upper end of the stem 22 is squared as is shown at 22a for operation by a complementary shaped socket 24a on a key 24 to open and close the valve 21.

The upper ends of the master valve 19 and 19a are enclosed in a casing or cover 25 secured to the valve housings in any suitable manner as indicated at 26, the top of the cover having openings 27 therein for receiving the key 24 to regulate the master valve.

Outlet pipes 28 and 28a communicate with the valve housings 19 and 19a respectively leading to the oil burners. Pipe fittings 29 and 29a are connected to the other ends of the inlet pipes 6 and 6a, the fittings having the ends of an inverted U-shaped vent tube 30 connected thereto and which extends upwardly above the top of the regulating and master valves. The top of the tube 30 is formed with vent openings 31 at the underside of the tube for venting air pressure from the valve housings 5, 5a caused by the fuel entering said housings.

In the operation of the device oil supply enters the regulating valves 5 and 5a, the adjustment of said valves determining the amount of oil flowing therethrough into the chambers 18 and 18a. From the chambers 18 and 18a the oil enters the master valves 19 and 19a which controls the feeding of the oil to the burners through the pipes 28 and 28a respectively. The master valves will be adjusted in accordance with the demand by a service man so there will be no danger of overflow of oil into the burner.

The master valve has a constant setting while the regulating valve has a variable setting and accordingly the service man upon installation will determine the proper setting of the master valve with the regulating valve wide open to allow the maximum amount of oil to vaporize in the oil burner. Once this setting has been determined the regulating valve can be adjusted in accordance with the requirements.

Accordingly the accidental opening of the service valves 5 and 5a will not cause an overflow of the burners since the flow of oil to the burners is at a constant rate in accordance with the setting of the master valve.

The cover 25 prevents tampering with the setting of the master valve.

It will be understood that the arrangement of the valves may be reversed; that is, the master valve could be at the inlet side and the regulated valve at the outlet side.

The master valves may also be provided with vents similar to the regulated valves and a single vent may be provided for the master and regulated valves rather than separate vents for each.

In view of the foregoing description taken in conjunction with the accompanying drawings it is believed that a clear understanding of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claim.

What I claim as my invention is:

A safety valve comprising a regulating valve housing having an inlet pipe communicating with the lower end thereof and a valve seat therein above the inlet pipe, a regulating valve member in said housing above said seat for engaging the same, a nipple extending laterally from said housing above said seat, a master valve housing having a lower chamber end threaded onto said nipple, said camber being closed and having a seat in the top wall thereof, a master valve member in said master valve housing outside said chamber for engaging the valve seat in said chamber, and a constantly open air vent pipe upstanding from the lower end of said regulating valve housing and communicating therewith below the valve seat therein to vent air pressure caused by fuel entering said inlet pipe, said air vent pipe upstanding above said master valve.

THEODORE W. CHAREST.

REFERENCES CITED

The following references are of record in the file of this patent:

UNITED STATES PATENTS

| Number | Name | Date |
|---|---|---|
| 456,546 | Blankerts | July 28, 1891 |
| 656,203 | Moyer | Aug. 21, 1900 |
| 847,456 | Barnes | Mar. 19, 1907 |
| 1,116,789 | Bothwell | Nov. 10, 1914 |
| 1,132,833 | Coseo | Mar. 23, 1915 |
| 1,155,168 | Andrew | Sept. 28, 1915 |
| 1,377,878 | French | May 10, 1921 |
| 1,960,844 | Gilbert | May 29, 1934 |
| 1,966,294 | Goslee | July 10, 1934 |

FOREIGN PATENTS

| Number | Country | Date |
|---|---|---|
| 518,967 | Great Britain | Mar. 13, 1940 |